UNITED STATES PATENT OFFICE.

FRANZ WEBEL, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PRODUCING DIOLEFINS.

1,026,420.   Specification of Letters Patent.   Patented May 14, 1912.

No Drawing.   Application filed January 30, 1912. Serial No. 674,419.

*To all whom it may concern:*

Be it known that I, FRANZ WEBEL, subject of the King of Bavaria, residing at Mannheim, Germany, have invented new and useful Improvements in Producing Diolefins, of which the following is a specification.

In the "*Journal für Praktische Chemie*", (2), Vol. 55, page 5, Ipatieff has described the production of a particular diolefin, viz. of isoprene, by heating dibrom-isopentane with alcoholic potash. I have found, however, that I can obtain much better yields of diolefins by heating a monohalogenated monohydric alcohol with a solid compound which is capable of catalytically splitting off halogen hydrid and water. As an instance of a compound which can be employed for thus splitting off halogen hydrid and water, I mention alumina. The reaction is preferably carried out by passing a monohalogenated monohydric alcohol in the state of vapor through a tube or the like containing the heated solid reagent, and it is also advantageous to carry out the reaction under reduced pressure. The tube containing the alumina, or the like, may, for instance, be from about 1 to 3 yards in length.

The process of my invention is of particular advantage for the production of diolefins which can be employed in the production of artificial caoutchouc and similar bodies, for instance, diolefins which contain four, five, or six carbon atoms.

In this invention the esters of the monohalogenated monohydric alcohols are equivalent to the alcohols themselves.

The following examples will serve to illustrate further the nature of my invention, which, however, is not confined to these examples. The parts are by weight.

Example 1: Pass vaporized trimethyl-ethylene-glycol-chlorhydin $$(CH_3)_2C(Cl)-CH(OH).CH_3,$$

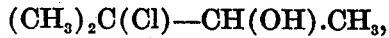

of a boiling point of from 138° to 142° C., over alumina heated to 350° C., while employing a pressure of 18 millimeters. The distillate contains methyl-isopropyl-ketone and isoprene.

Example 2: Pass vaporized acetic ester of 3-brom-2-methyl-butanol-(1)

$$CH_2(OCOCH_3)-CH(CH_3)-CHBr-CH_3$$

over alumina at 30 millimeters pressure and at 400° C., whereupon acetic acid, hydrobromic acid and isoprene are obtained.

Now what I claim is:—

1. The process of producing diolefins by heating a monohalogenated monohydric alcohol with a solid compound which is capable of catalytically splitting off halogen hydrid and water.

2. The process of producing diolefins by heating a monohalogenated monohydric alcohol under reduced pressure with a solid compound which is capable of catalytically splitting off halogen hydrid and water.

3. The process of producing isoprene by heating trimethyl-ethylene-glycol chlorhydrin with alumina.

4. The process of producing isoprene by heating trimethyl-ethylene-glycol chlorhydrin with alumina under reduced pressure.

5. The process of producing isoprene by passing vaporized trimethyl-ethylene-glycol chlorhydrin at a pressure of from 15 to 20 millimeters over alumina at a temperature of from 340° to 360° C.

In testimony whereof I have hereunto set my hand in the presence of two subscribing witnesses.

FRANZ WEBEL.

Witnesses:
 J. ALEC. LLOYD,
 A. O. TITTMANN.